(12) United States Patent
Schlipf et al.

(10) Patent No.: US 6,761,546 B2
(45) Date of Patent: Jul. 13, 2004

(54) GEAR PUMP HAVING BEARINGS WITH COOLING DUCTS

(75) Inventors: Edgar R. Schlipf, Hochdorf (DE); Peter Heidemeyer, Kornwestheim (DE); Rainer Herter, Untergruppenbach (DE)

(73) Assignee: Coperion Werner & Pfleiderer GmbH & Co. KG (DE)

( * ) Notice: Subject to any disclaimer, the term of this patent is extended or adjusted under 35 U.S.C. 154(b) by 0 days.

(21) Appl. No.: 10/297,789

(22) PCT Filed: Jun. 1, 2001

(86) PCT No.: PCT/EP01/06264
§ 371 (c)(1),
(2), (4) Date: Dec. 9, 2002

(87) PCT Pub. No.: WO02/01072
PCT Pub. Date: Jan. 3, 2002

(65) Prior Publication Data
US 2003/0147765 A1 Aug. 7, 2003

(30) Foreign Application Priority Data
Jun. 28, 2000 (DE) .......................................... 100 31 470

(51) Int. Cl.⁷ .............................. F04C 2/18; F04C 15/00
(52) U.S. Cl. ....................... 418/102; 418/83; 418/206.3; 418/206.7; 418/206.8

(58) Field of Search ........................ 418/83, 102, 206.3, 418/206.7, 206.8

(56) References Cited

U.S. PATENT DOCUMENTS

| 3,134,336 A | * | 5/1964 | Huffman et al. | ......... 418/206.7 |
| 4,038,000 A | * | 7/1977 | Dworak | .................... 418/206.3 |
| 6,210,042 B1 | | 4/2001 | Wang et al. | ................. 384/317 |

FOREIGN PATENT DOCUMENTS

| DE | 349 786 C | 3/1922 |
| EP | 0 607 999 B1 | 2/1994 |
| EP | 0 669 465 A2 | 5/1995 |
| EP | 0 715 078 A2 | 2/1996 |
| GB | 264105 | 1/1927 |
| GB | 1124147 | 8/1968 |
| GB | 2 121 118 A | 3/1983 |

* cited by examiner

*Primary Examiner*—John J. Vrablik
(74) *Attorney, Agent, or Firm*—James B. Conte; Barnes & Thornburg

(57) ABSTRACT

A gear pump comprises a casing and gear rotors disposed therein. The gear rotors are lodged in bearing sections of plain bearings that are lubricated by the pumping medium. They have at least one cooling duct which is embodied such that cooling varies along the circumference and/or in the longitudinal direction and/or in the radial direction of the plain bearing.

15 Claims, 4 Drawing Sheets

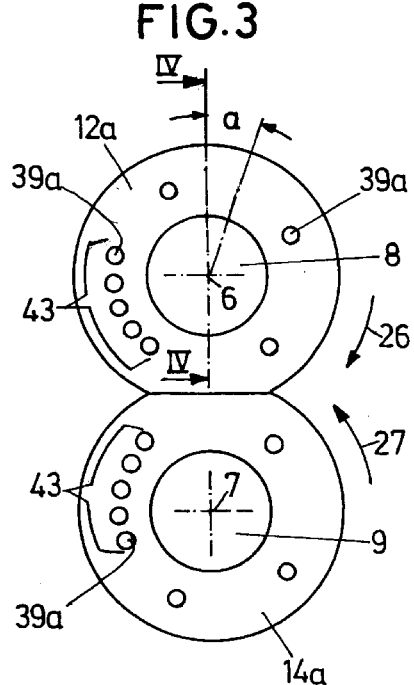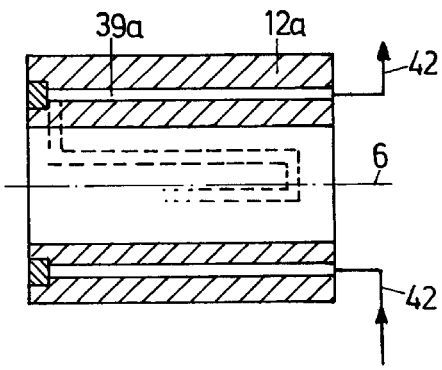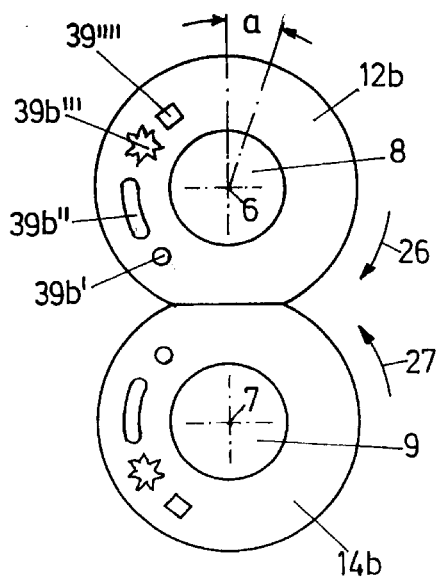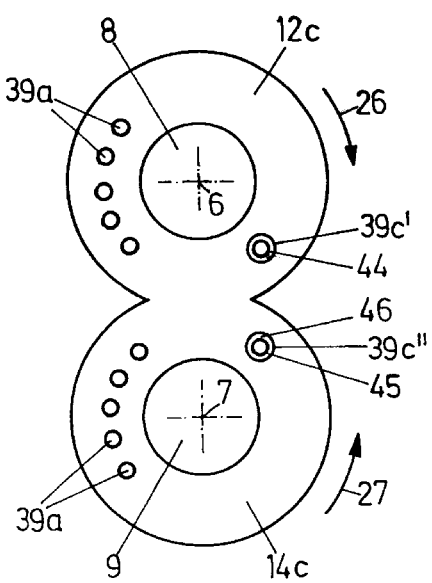

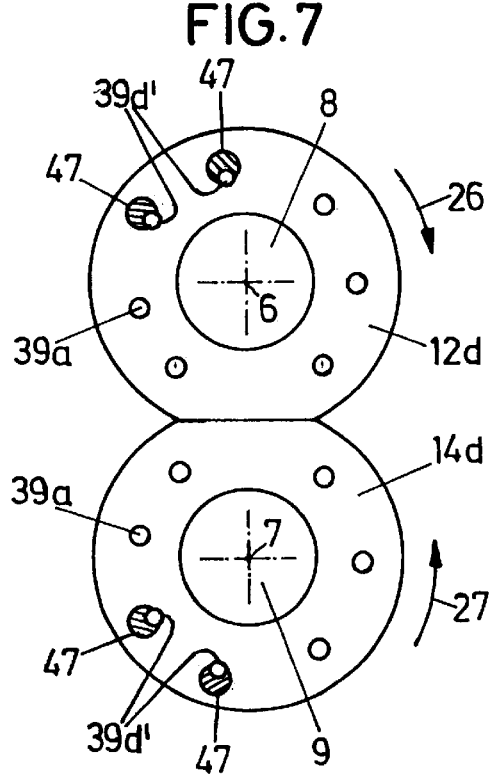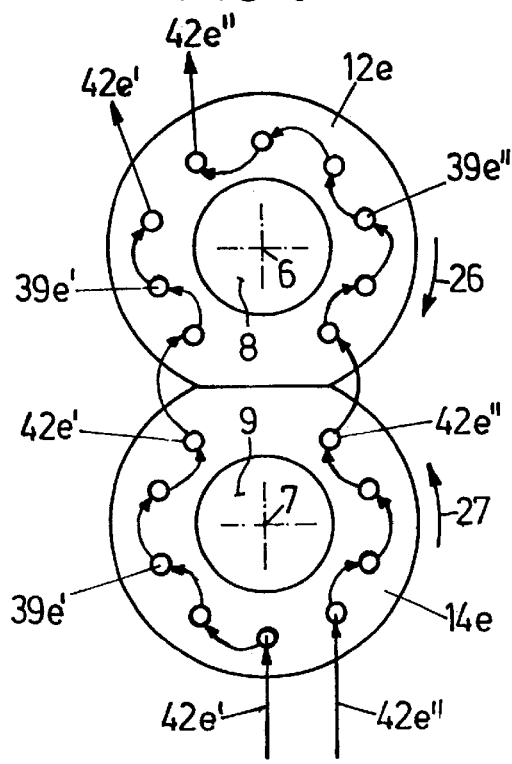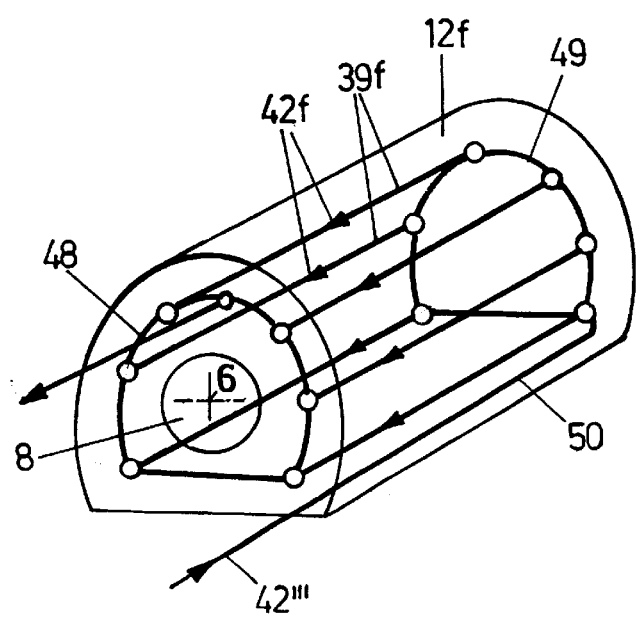

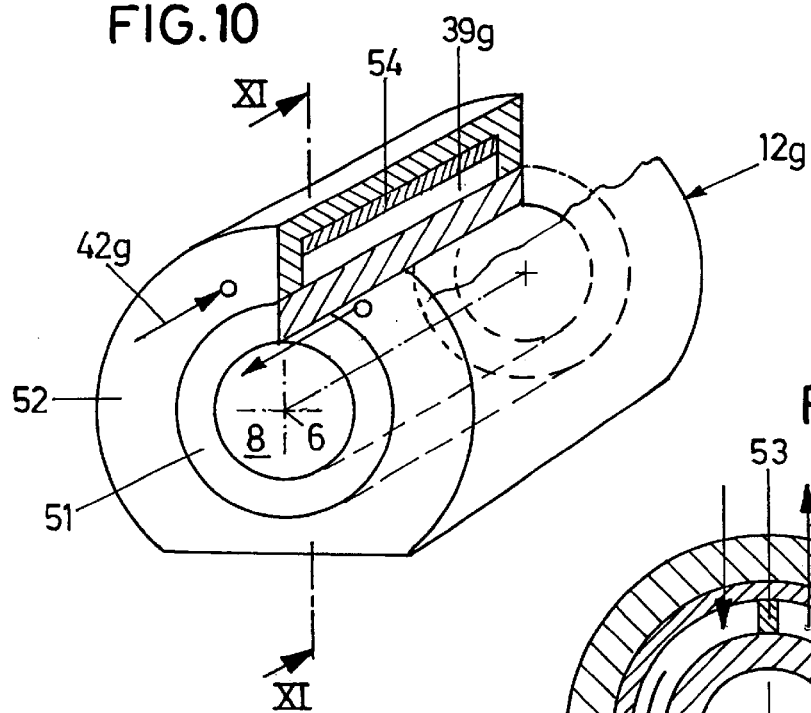
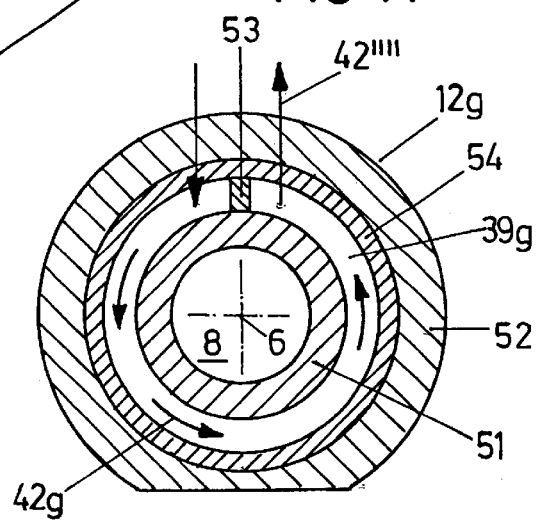
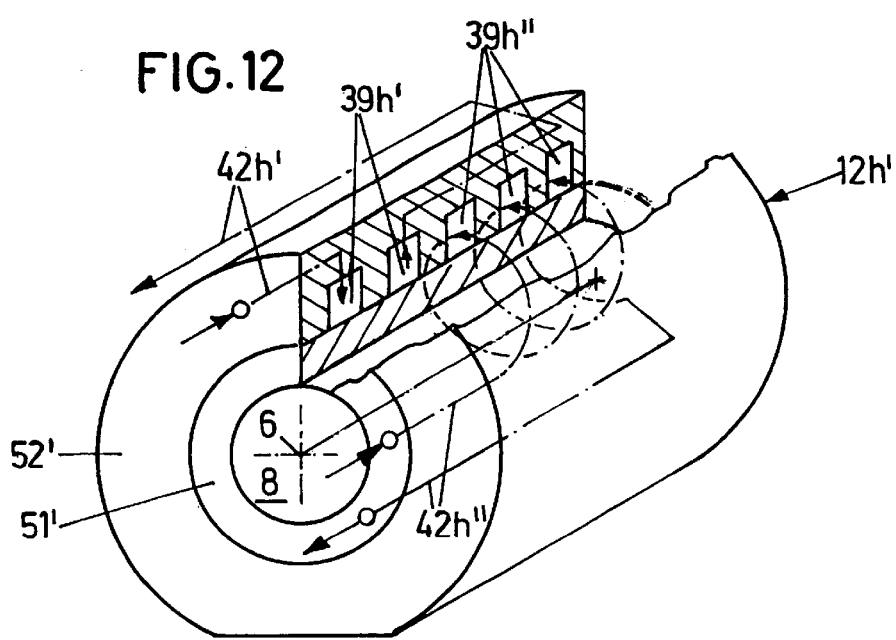

GEAR PUMP HAVING BEARINGS WITH COOLING DUCTS

The invention relates to a gear pump according to the preamble of claim 1.

In gear pumps of the generic type, the temperature of the bearing is of decisive importance for the maximally admissible speed and thus for the throughput of the pump. Plain bearings being customarily lubricated by the pumping medium, high energy feed is occasioned in the bearing clearance in the case of highly viscous pumping media. Since the pumping medium has a maximally admissible maximum temperature, the speed and thus the throughput of the gear pump are limited. This is of special importance when the pumping medium is plastic melt, the maximally admissible temperatures of which range from 300 to 350° C.

EP 0 715 078 A2 describes a gear pump of the generic type which has cooling ducts meandering in the plain bearing.

EP 0 607 999 B1 teaches to provide the shaft of the gear rotors with cooling ducts.

The invention is based on the knowledge that the development of heat in the plain bearing varies along the circumference thereof and over the extension thereof in the direction of the central longitudinal axis.

It is an object of the invention to embody a gear pump of the generic type for optimal heat removal in the plain bearing.

Customarily, the highest energy feed is occasioned at the place of most reduced bearing clearance i.e., the clearance between the bearing section of the shaft and the area of the bearing shell called plain bearing; this is the place of maximum shearing of the highly viscous pumping medium. This is where mechanical energy is converted into heat energy to an especially high degree. Very thorough cooling is required in this area.

The sub-claims reflect numerous advantageous and partially inventive embodiments.

Further features, advantages and details of the invention will become apparent from the ensuing description of exemplary embodiments, taken in conjunction with the drawing, in which FIG. 1 is a cross-sectional view of a gear pump on the line I—I of FIG. 2;

FIG. 3 is a plan view of a first embodiment of plain bearings in accordance with the arrow III of FIG. 2;

FIG. 4 is a longitudinal sectional view of the plain bearing on the line IV—IV of FIG. 3;

FIG. 5 is an illustration, corresponding to FIG. 3, of a plan view of a second embodiment of plain bearings;

FIG. 6 is a plan view, corresponding to FIG. 3, of a third embodiment of plain bearings;

FIG. 7 is a plan view, corresponding to FIG. 3, of a fourth embodiment of plain bearings;

FIG. 8 is a plan view, corresponding to FIG. 3, of a fifth embodiment of plain bearings;

FIG. 9 is a perspective view of a sixth embodiment of plain bearings;

FIG. 10 is a perspective view of a seventh embodiment of plain bearings;

FIG. 11 is a cross-sectional view of the plain bearing on the line XI—XI of FIG. 10; and FIG. 12 is a perspective view of an eighth embodiment of a plain bearing.

Figure 1:
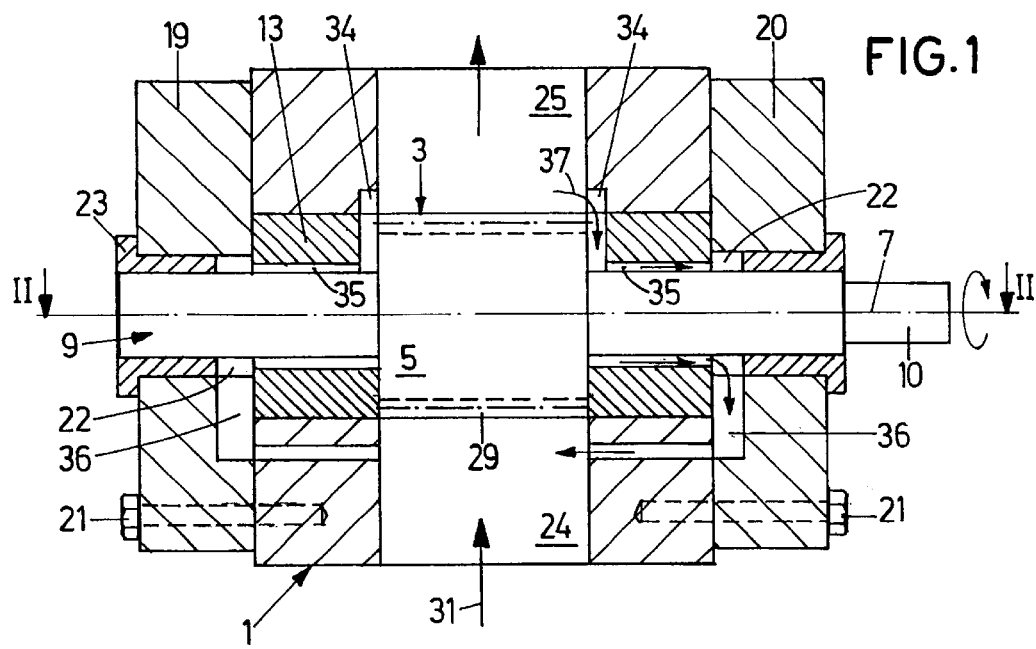
Figure 2:
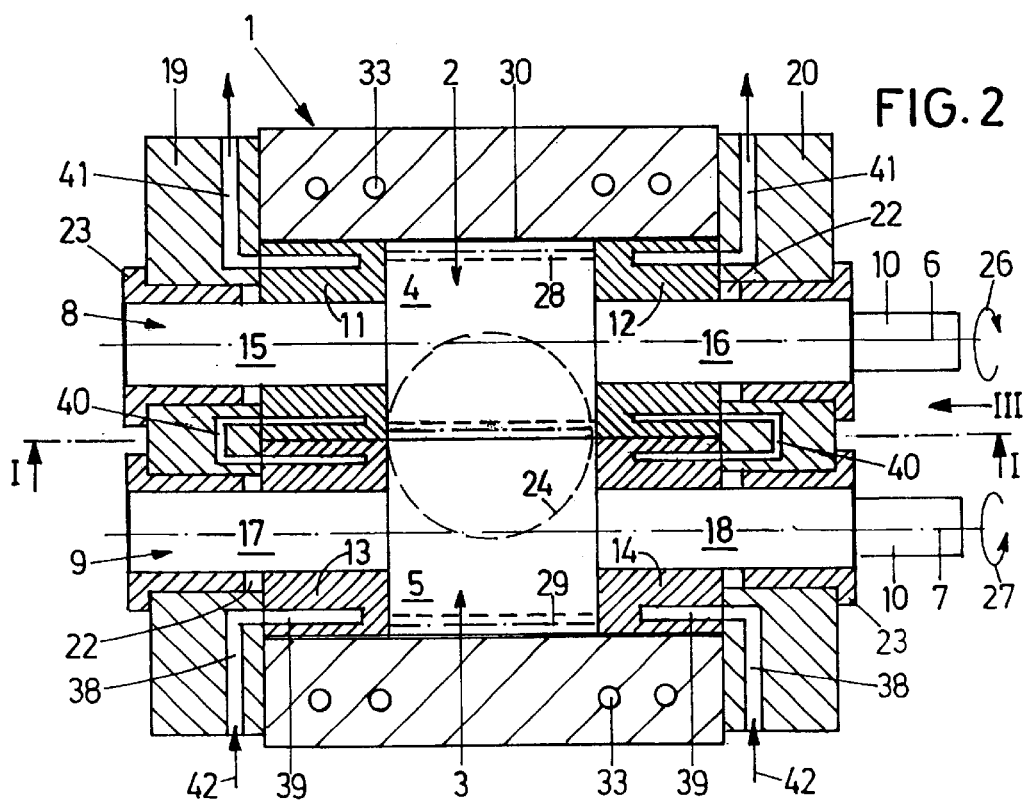
FIG. 2 is a cross-sectional view of the gear pump on the line II—II of FIG. 1.

The gear pump seen in FIGS. 1 and 2 comprises a casing 1 with two gear rotors 2, 3 disposed therein. Each rotor 2, 3 has a serrated section 4, 5; the serrated sections 4, 5 intermesh. Each rotor 2, 3 further comprises a shaft 8, 9, which is coaxial of the central longitudinal axis 6, 7 of the rotor 2 and 3 and non-rotatably joined to the gear section 4 and 5 and one end of which is provided with a driving journal 10.

On both sides of the serrated sections 4, 5, plain bearings 11, 12, 13, 14 are disposed and supported in the casing 1, with the shafts 8, 9 being rotatably lodged therein by bearing sections 15, 16, 17, 18. The fronts of the casing 1 are closed by two covers 19, 20 which are releasably fixed by screws 21 (roughly outlined). The shafts 8, 9 are extended out of the casing through apertures 22 in the covers 19, 20. A seal 23 is provided, sealing between the respective shaft 8, 9 and the aperture 22.

The plane seen in FIG. 2, which is perpendicular to the plane spanned by the two axes 6, 7, includes the suction side 24 of the pump to one side of the rotors 2, 3; the delivery side 25 is on the opposite side. In accordance with the arrows 26, 27 of rotary direction, the rotors 2, 3 are actuated in opposite senses; their serrations 28, 29 rotate nearly without play towards the inside wall 30 of the casing 1. They convey the fluid that is to be pumped from the suction side 24 to the delivery side 25, corresponding to the arrow of conveying direction 31.

The casing 1 comprises conduits 33 for a temperature-regulating fluid. The plain bearings 11 to 14 are lubricated by the pumping medium, as a rule a more highly viscous or intrinsically viscous pumping medium such as plastic melt. To this end, pumping-medium branch conduits 34 discharge on the delivery side 25 of the pump, leading to the plain bearing clearance or clearances 35 that are parallel to the respective axis 6 or 7, where the pumping medium conventionally serves for lubrication between the respective bearing section 15 to 18 of the shaft 8 and 9 and the respective plain bearing 11 to 14. From the plain bearings 11 to 14, the pumping medium is returned, via pumping-medium-return conduits 36, to the suction side 24; part of the return conduits 36 are formed in the respective cover 19, 20 and part of them in the casing 1. Consequently, the pumping medium flows through the plain bearings 11 to 14 in accordance with the arrow of flow direction 37 from the delivery side 25 to the suction side 24 of the pump.

The plain bearings 11 to 14 are cooled. To this end, each cover 19 and 20 comprises a coolant supply conduit 38 which is connected to one or several cooling ducts 39 in the plain bearing 13 and 14. Formed in each cover 19, 20 between the shafts 9, 8 is an overflow duct 40 which is connected to corresponding cooling ducts 39 in the plain bearing 11, 12. The coolant flows from the cooling duct 39 of the plain bearings 11, 12 through a coolant discharge duct 41. Consequently, the coolant flows in the flow direction 42 through the ducts.

The following is a description of various embodiments of cooling ducts 39. Since the design is identical or mirror-symmetrical in the individual plain bearings 11 to 14, the ensuing description of design and arrangement only deals with a plain bearing 12.

In the embodiment according to FIGS. 3 and 4, the plain bearings 12a, 14a have continuous cooling ducts 39a of identical cross-sectional shape which meander in parallel to the axis 6 and 7, but which vary in distribution along the periphery of the plain bearing 12a, 14a. As seen in FIG. 3, the plain bearings have an area 43 where the cooling ducts 39a are comparatively closely packed. Consequently, heat removal from the plain bearing is considerably greater in this area than in the other areas where neighboring cooling ducts 39a have a greater distance from each other. The heat-removing surface of the cooling ducts 39a per peripheral unit i.e., per unit angle a, is greater in the area 43 than in the other circumferential areas.

In another embodiment according to FIG. 5, the cooling ducts 39b also meander as roughly outlined in FIG. 4. However, they have heat-exchanging surfaces of varying size per peripheral unit i.e., per unit angle a, distributed along the periphery. Consequently, the cooling ducts 39b have varying cross-sectional shapes. These may be a cooling duct 39b' of cylindrical cross-sectional shape, or a cooling duct 39b"" of oval or reniform cross-sectional shape, a cooling duct 39b'" having the cross-section of a spline, or a cooling duct 39b"" of square cross-sectional shape. These cooling ducts 39b have heat-exchanging surfaces that deviate in shape and/or size.

In the embodiment according to FIG. 6, cooling ducts 39a are formed in the plain bearings 12c, 14c, which meander as in the embodiment according to FIG. 4. In the area of comparatively low energy feed, provision is made for cooling ducts 39c with surfaces of varying design by which to influence the heat transmission, per unit area of the cooling duct 39c, from the plain bearing 12c and 14c to the coolant. This may be varying surface roughness affecting the heat transmission coefficients. It is also conceivable to use materials that differ in heat transmission. An insulating bush 44 has been inserted in a cooling duct 39c', which is a solid material bush. An insulating bush 45 has been inserted in a cooling duct 39c', with some clearance 46 formed between the bush 45 and the material of the plain bearing 14c.

In the embodiment according to FIG. 7, cooling ducts 39a are formed in the plain bearings 12d and 14d, which meander as in the embodiment of FIG. 4. Some of the cooling ducts 39d' have an insulator 47 along part of their circumference on the side turned away from the axis 6 and 7, so that excellent heat removal takes place from the area of the shaft 8, 9, whereas only reduced heat removal or feed will take place from the outer area of the plain bearing i.e., from the casing 1.

In the exemplary embodiment of FIG. 8, provision is made for two meandering cooling ducts 39e' and 39e" in the plain bearing 12e, 14e. Coolant is separately supplied to these cooling ducts 39e' and 39e"; the coolant supplied may differ and have varying thermal capacity. It flows through the cooling ducts 39e', 39e" in the flow direction 42e' and 42e". The coolants, which are supplied through the two cooling ducts 39e' and 39e", can be regulated or controlled individually in temperature and/or in quantity per unit of time.

In keeping with FIG. 9, cooling ducts 39f may be arranged not only serially i.e., successively—as in the above exemplary embodiments—but coolant flow may take place also in a parallel arrangement. In this case, cooling ducts 39f of identical flow direction 42f are formed in the plain bearing 12f. Junction ducts 48 and 49 are formed in the vicinity of the two ends of a plain bearing 12f. A return duct 50 leads back to the junction duct 49, where the coolant is collected after passage through the cooling ducts 39f, for connection to the overflow duct 40 or the discharge duct 41. In this case too, the cooling ducts 39f may of course have the shapes and arrangements as defined in the embodiments of FIGS. 3 to 8.

In the embodiment according to FIGS. 10 and 11, the plain bearing 12g is of two-piece design; it includes an interior bearing bush 51 and an exterior bush 52, between which is formed an annular cylindrical cooling duct 39g, which is divided by a dividing wall 53 that is parallel to the axis 6 so that the cooling is forcibly guided in the flow direction 42g through the cooling duct 39g and discharged in the flow direction 42"". For heat supply i.e., the supply of energy, from the side of the casing 1 to be reduced, the exterior bush 52 is lined with an insulating jacket 54. Correspondingly, there is disproportionate heat removal from the shaft 8.

The embodiment of FIG. 12—as the embodiment of FIGS. 10 and 11—is a so-called wet bearing bush. The plain bearing 12h is configured of an exterior bush 52' and an interior bearing bush 51'. Provided in the exterior bush 52' are helical cooling ducts 39h' and 39h" which form separate cooling circuits. Coolants are supplied thereto in the flow direction 42h' and 42h", which vary in temperature and/or quantity per unit of time.

Although the above embodiments predominantly describe designs of plain bearings in which the cooling ducts 39 of the two plain bearings 11, 13 and 12, 14 on one side of the rotors 2, 3 are connected in series, it is of course possible that coolant flow is fed to the individual cooling ducts separately or in parallel. In this case, the overflow duct 40 is for instance replaced by a coolant discharge or supply line.

We claim:

1. A gear pump comprising a casing (1),
which has a suction side (24) and a delivery side (25);

two intermeshing gear rotors (2, 3) which are disposed in the casing (1), and
which convey a high viscous pumping medium from the suction side (24) to the delivery side (25), and
which have bearing sections (15 to 18) at their ends;

plain bearings (11 to 14),
each of which, by formation of a clearance, lodges a bearing section (15 to 18),
which are lubricated by the pumping medium, and
which include at least a cooling duct (39);

pumping medium branch conduits (34)

which discharge from the delivery side (25) and lead to the clearances (35) of each plain bearing (11 to 14):

pumping medium return conduits (36), which lead from the clearances (35) to the suction side (24);

a coolant supply conduit (38) which is connected to the at least one cooling duct (39) to provide the cooling duct (39) with a coolant; and a coolant discharge duct (41) for discharging said coolant from the at least one cooling duct (39);

wherein the at least one cooling duct (39) is embodied such that cooling varies along the circumference and/or in the longitudinal direction and/or in the radial direction of the plain bearing (11 to 14) so that the most intense cooling takes place in an area of smallest width of the clearance.

2. A gear pump according to claim 1, wherein cooling ducts (39a) are disposed in a greater number per peripheral unit (a) in an area (43) where they are closely packed than in other peripheral areas of the plain bearings (12a, 14a).

3. A gear pump according to claim 1, wherein cooling ducts (39b', 39b", 39b'", 39b"") have surfaces of varying dimensions.

4. A gear pump according to claim 1, wherein cooling ducts (39b', 39b", 39b'", 39b"") have varying cross-sectional shapes.

5. A gear pump according to claim 1, wherein cooling ducts (39*e'*, 39*e"*) are provided which are combined to form at least two separate cooling circuits.

6. A gear pump according to claim 1, wherein the cooling ducts (39*a*, 39*b*, 39*c*, 39*d*, 39*e*) are connected in series.

7. A gear pump according to claim 1, wherein the cooling ducts (39*f*) are connected in parallel in a plain bearing (12*f*).

8. A gear pump according to claim 1, wherein the cooling ducts (39*a*, 39*b*, 39*c*, 39*d*, 39*e*, 39*f*) are elongated.

9. A gear pump according to claim 1, wherein the at least one cooling duct (39*h'*, 39*h"*) is helical.

10. A gear pump according to claim 1, wherein individual cooling ducts (39*c'*, 39*c"*, 39*d'*), at least in part, have surfaces of reduced thermal conductivity.

11. A gear pump according to claim 10, wherein at least one cooling duct (39*d*) is partly insulated by an insulator (47) on the side facing outwards radially of the central longitudinal axis (6, 7).

12. A gear pump according to claim 10, wherein an insulating bush (44, 45) is inserted in a cooling duct (39*c'*, 39*c"*).

13. A gear pump according to claim 12, wherein a clearance (46) is provided between the insulating bush (45) and the plain bearing (14*c*).

14. A gear pump according to claim 1, wherein the at least one cooling duct (39*g*) is annular cylindrical.

15. A gear pump according to claim 14, wherein the at least one cooling duct (39*g*) is externally provided with an insulating jacket (54).

* * * * *